US011486335B2

(12) United States Patent
Menou et al.

(10) Patent No.: US 11,486,335 B2
(45) Date of Patent: Nov. 1, 2022

(54) TURBOFAN ENGINE COMPRISING A SET OF ROTATABLE BLADES FOR BLOCKING OFF THE BYPASS FLOW DUCT

(71) Applicant: Airbus Operations SAS, Toulouse (FR)

(72) Inventors: Fabien Menou, Toulouse (FR); Laurent Cazeaux, Toulouse (FR); Thierry Gaches, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/516,251

(22) Filed: Nov. 1, 2021

(65) Prior Publication Data

US 2022/0136459 A1    May 5, 2022

(30) Foreign Application Priority Data

Nov. 3, 2020  (FR) ...................................... 2011262

(51) Int. Cl.
 *F02K 3/02* (2006.01)
 *F02K 1/70* (2006.01)
 *F02K 1/74* (2006.01)

(52) U.S. Cl.
 CPC ................. *F02K 3/02* (2013.01); *F02K 1/70* (2013.01); *F02K 1/74* (2013.01); *F05D 2220/323* (2013.01)

(58) Field of Classification Search
 CPC ..... F02K 3/02; F02K 3/04; F02K 3/06; F02K 1/32; F02K 1/54; F02K 1/64; F02K 1/68; F02K 1/70; F02K 1/74; F05D 2220/323
 See application file for complete search history.

(56) References Cited

U.S. PATENT DOCUMENTS

| 2,933,890 | A | 4/1960 | Morrison |
| 2009/0321561 | A1 | 12/2009 | Andre et al. |
| 2017/0198659 | A1* | 7/2017 | Gormley ................... F02K 1/72 |
| 2018/0030926 | A1* | 2/2018 | Eckett ....................... F02C 3/04 |
| 2019/0284952 | A1* | 9/2019 | Gardes .................. F01D 17/167 |

FOREIGN PATENT DOCUMENTS

| EP | 3193002 A1 | 7/2017 |
| EP | 3540203 A1 | 9/2019 |

OTHER PUBLICATIONS

French Search Report; priority document.

* cited by examiner

*Primary Examiner* — Jacob M Amick
(74) *Attorney, Agent, or Firm* — Greer, Burns & Crain, Ltd.

(57) ABSTRACT

A turbofan engine having a duct for a bypass flow and blades. Each blade is mobile between a stowed position and a deployed position. Each blade includes a rigid core a second, free end, and a sheath into which the core and the second end slide. Each sheath includes a first part which surrounds at least one part of the core and the second end, and an aileron which extends beyond the core facing the first part of the adjacent blade. The sheath is made of a flexible material such that the bypass flow causes the sheath to come into contact with the first part of the adjacent blade. A turbofan engine of this kind makes it possible to create blades whose production costs are low but whose aerodynamic behavior is effective.

7 Claims, 4 Drawing Sheets

TURBOFAN ENGINE COMPRISING A SET OF ROTATABLE BLADES FOR BLOCKING OFF THE BYPASS FLOW DUCT

CROSS-REFERENCES TO RELATED APPLICATIONS

This application claims the benefit of the French patent application No. 2011262 filed on Nov. 3, 2020, the entire disclosures of which are incorporated herein by way of reference.

FIELD OF THE INVENTION

The present invention relates to a turbofan engine which comprises a set of blades which are mounted so as to be able to rotate in order to block the duct for the bypass flow, each blade being provided with an envelope having an aerodynamic edge, and to an aircraft comprising at least one such turbofan engine.

BACKGROUND OF THE INVENTION

An aircraft includes a fuselage to each side of which is fixed a wing. Under each wing is suspended at least one turbofan engine. Each turbofan is fixed under the wing by means of a pylon that is fixed between the structure of the wing and the structure of the turbofan engine.

The turbofan engine comprises a motor and a nacelle that is fixed around the motor. The turbofan engine has, between the nacelle and the motor, a bypass duct in which a bypass flow flows.

It is known to use blades to bring about thrust reversal. Each blade is mobile in rotation on the structure of the nacelle, between a stowed position in which it is not in the bypass duct and a deployed position in which it is positioned across the bypass duct in order to redirect the bypass flow towards a window which is in the wall of the nacelle, and which is open between the bypass duct and the outside of the nacelle.

Thus, the bypass flow is redirected to the outside and more specifically towards the front of the turbofan engine in order to generate reverse thrust.

Although installation of this kind is satisfactory, it is desirable to find a blade shape that is simple but that has an effective aerodynamic profile.

SUMMARY OF THE INVENTION

One aim of the present invention is to propose a turbofan engine which comprises a set of blades that are mounted so as to be able to rotate in order to block the duct for the bypass flow and where each blade is accommodated in an envelope having an aerodynamic edge.

To that end, the present document proposes a turbofan engine comprising a motor and a nacelle, surrounding the motor, where a duct in which a bypass flow flows is delimited between the nacelle and the motor, the nacelle comprising a plurality of blades, each blade being mounted mobile in rotation between a stowed position in which the blade is not in the duct and a deployed position in which the blade is across the duct, each blade comprising a rigid core having a first end that is mounted mobile in rotation and a second, free end, and a sheath comprising a first part which surrounds at least one part of the core and the second end, and an aileron which extends beyond the core facing the first part of the adjacent blade, the sheath being made of a flexible material such that, in the deployed position, the bypass flow causes the aileron to come into contact with the first part of the adjacent blade.

A turbofan engine of this kind makes it possible to create blades whose production costs are low but whose aerodynamic behavior is effective.

Advantageously, at a distance from the first part, the aileron has a tapered edge.

According to one embodiment, the first part and the aileron are monolithic.

According to another embodiment, the first part and the aileron are two distinct parts that are fixed to one another.

Advantageously, the blade comprises an insert accommodated in a hollow created in the aileron.

Advantageously, the insert is connected to the core by a rigid connecting element.

The invention also proposes an aircraft having at least one turbofan engine according to one of the preceding variants.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

In the following description, the terms relating to a position refer to the direction of flow of the air in a turbofan engine which therefore flows from the front to the rear of the aircraft.

Figure 1:
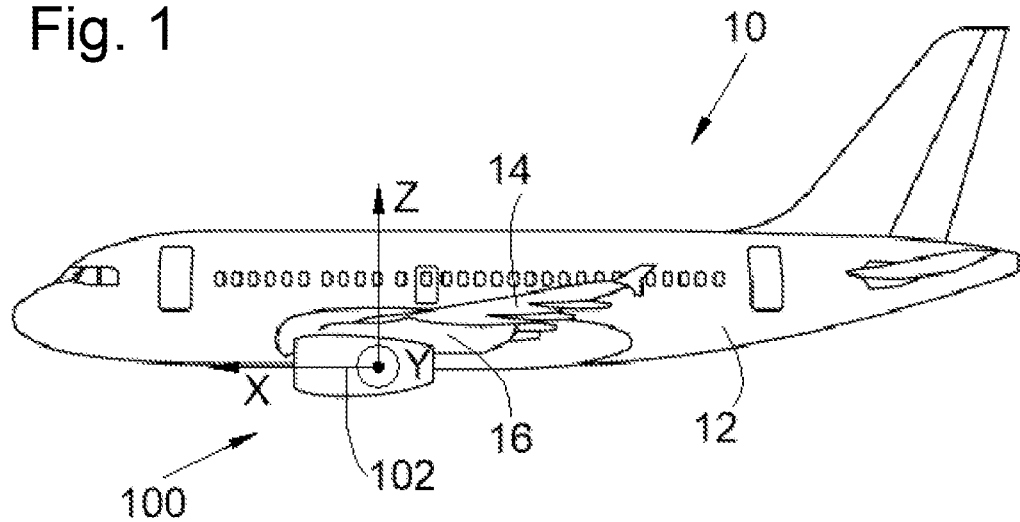
FIG. 1 is a side view of an aircraft comprising a turbofan engine according to the invention.

FIG. 1 shows an aircraft 10 that includes a fuselage 12, on each side of which there is fixed a wing 14 that bears at least one turbofan engine 100 according to the invention. The turbofan engine 100 is fixed under the wing 14 by means of a pylon 16.

Figure 2:
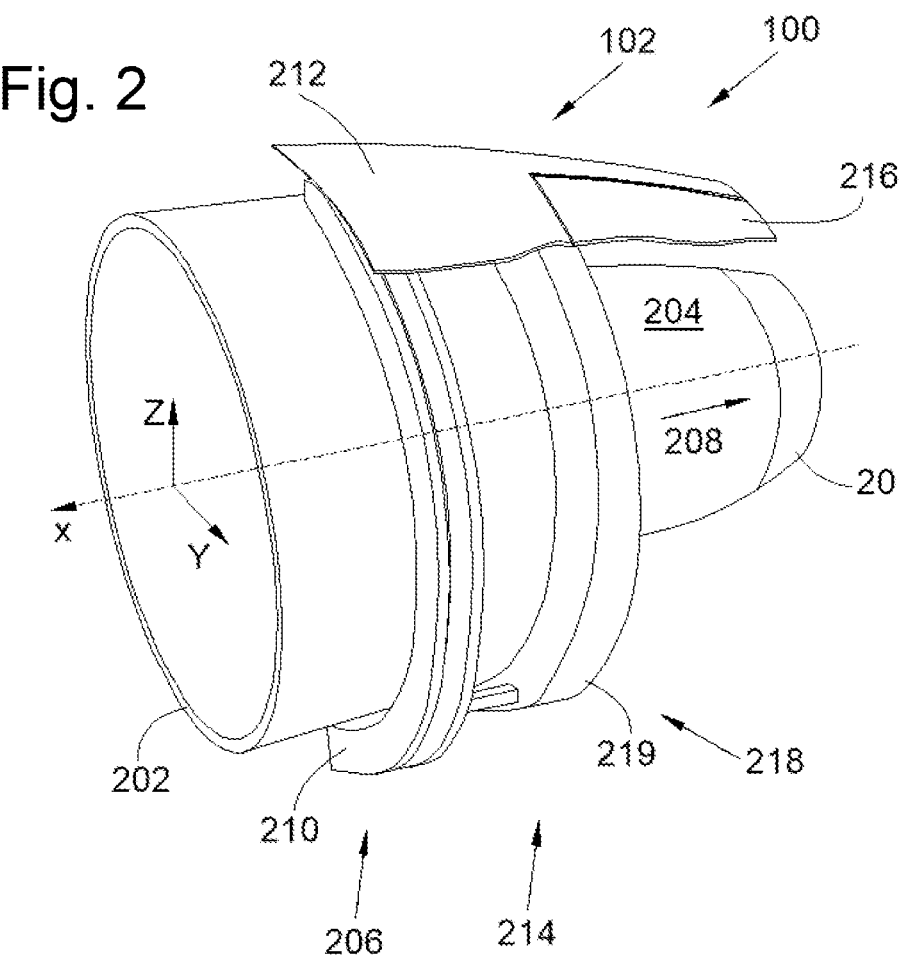
FIG. 2 is a perspective view of the turbofan engine according to the invention, in the advanced and stowed position.
Figure 3:
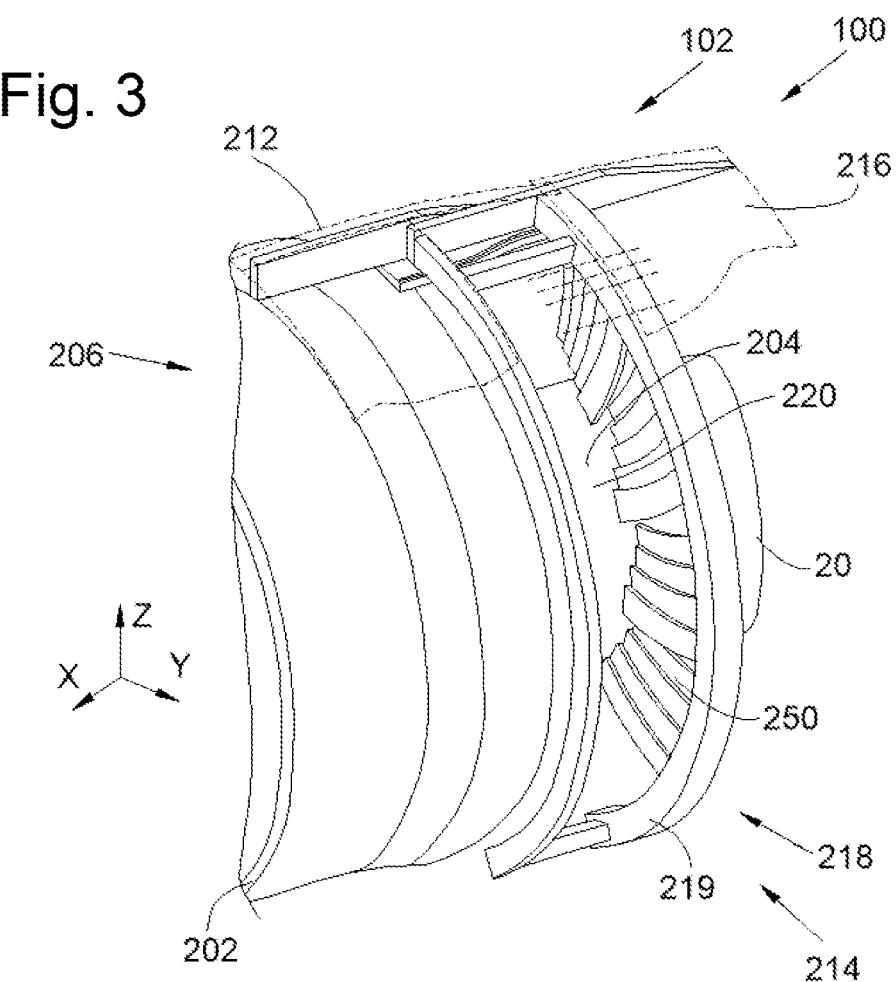
FIG. 3 is a perspective view of the turbofan engine according to the invention, in the retracted and deployed position.

FIG. 2 and FIG. 3 show the turbofan engine 100 which has a nacelle 102 and a motor 20 which is accommodated inside the nacelle 102 and which comprises a fan casing 202. The motor 20 is represented by its rear exhaust part and its fan casing 202.

In the following description, and by convention, X denotes the longitudinal axis of the turbofan engine 100 that is parallel to the longitudinal axis of the aircraft 10 oriented positively towards the front of the aircraft 10, Y denotes the transverse axis that is horizontal when the aircraft is on the ground, and Z denotes the vertical axis, these three directions X, Y and Z being mutually orthogonal.

Figure 4:
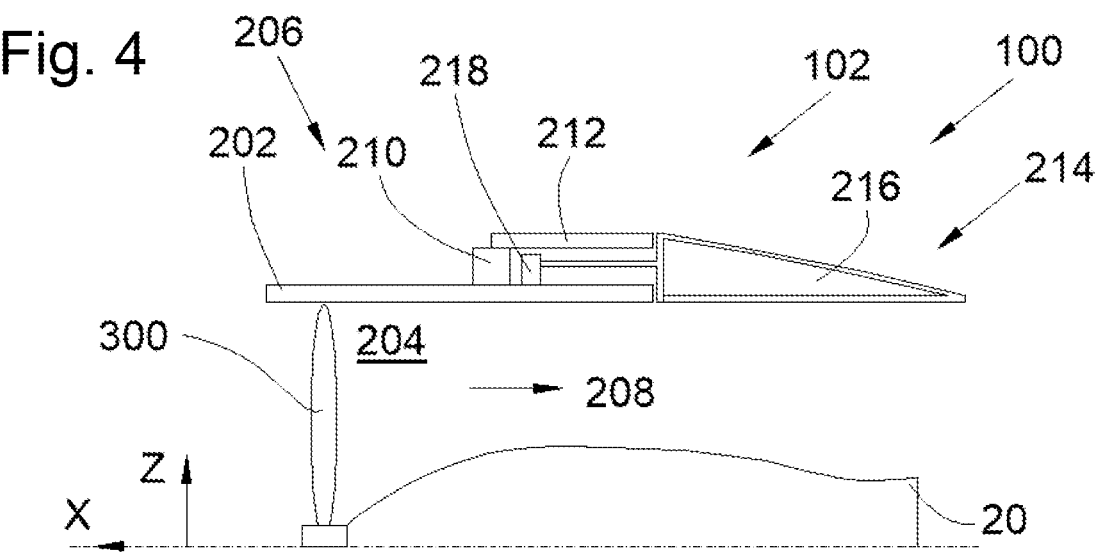
FIG. 4 is a schematic representation of a turbofan engine according to the invention, viewed in section along a vertical plane.

FIG. 2 and FIG. 3 show the turbofan engine 100 in two different use positions, and FIG. 4 shows a schematic representation in section of the turbofan engine 100.

The turbofan engine 100 has, between the nacelle 102 and the motor 20, a duct 204 in which there flows a bypass flow 208 coming from the air intake through a fan 300, and which therefore flows in the flow direction from front to rear.

The nacelle 102 has a fixed structure 206 that is mounted fixed on the fan casing 202. Here in particular, the fixed structure 206 comprises a front frame 210 mounted around the fan casing 202 and outer panels 212 forming an aerodynamic surface which are shown as transparent in FIG. 3, and of which a portion is cut away in FIGS. 2 and 3.

The nacelle 102 has a mobile assembly 214 which has a mobile cowl 216 (also transparent in FIG. 3) of which a portion is cut away in FIGS. 2 and 3 and which forms the outer walls of the nozzle.

The nacelle 102 also has a slider 218. In this case, the slider 218 is in the form of a cylinder having openwork walls. The mobile cowl 216 is fixed to and downstream of the slider 218 with respect to the direction of flow of the flow of air in the turbofan engine 100.

The slider 218 is mounted mobile in translation in a translation direction globally parallel to the longitudinal axis X on the fixed structure 206 of the nacelle 102.

The slider 218 is mobile between an advanced position (FIG. 2) and a retracted position (FIG. 3) and vice versa. In the advanced position, the slider 218 is positioned as far forward as possible, with respect to the flow direction, such that the mobile cowl 216 is moved close to the outer panels 212 and to the fan casing 202 and thus forms an aerodynamic surface. In the retracted position, the slider 218 is positioned as far aft as possible, with respect to the flow direction, such that the mobile cowl 216 is moved away from the outer panels 212 and from the fan casing 202 so as to define, between them, a window 220.

In the advanced position, the mobile cowl 216 and the outer panels 212 extend one another so as to define the outer surface of the nacelle 102, and the mobile cowl 216 and the fan casing 202 extend one another so as to define the outer surface of the duct 204.

In the retracted position, the mobile cowl 216 and the fan casing 202, and the outer panels 212, are spaced apart from one another and define, between them, the open window 220 between the duct 204 and the exterior of the nacelle 102. That is to say, the air from the bypass flow 208 passes through the window 220 to end up outside the turbofan engine 100, which corresponds to a thrust reversal position.

The slider 218 is made to translate by any appropriate means, such as slideways between the fixed structure 206 and the slider 218.

The nacelle 102 also comprises a set of actuators (not shown) that move the slider 218 in translation between the advanced position and the retracted position and vice versa. Each actuator is controlled by a control unit, or controller, for example of the processor type, which controls the movements in one direction or the other according to the requirements of the aircraft 10.

Each actuator may, for example, take the form of a double-action jack (two working directions), of which the cylinder is fixed to the fixed structure 206 and a rod is fixed to the slider 218.

In order to orient the flow of air leaving the window 220, cascades can be fixed to the slider 218 facing the window 220.

The fan casing 202 and the outer panels 212 form the upstream boundary of the window 220 with respect to the direction of flow and the mobile cowl 216 forms the downstream boundary of the window 220 with respect to the direction of flow.

The nacelle 102 comprises a plurality of blades 250, each being mounted so as to be able to rotate on the slider 218 about an axis of rotation that, here, is generally parallel to the longitudinal axis X. Thus, each blade 250 is able to move between a stowed position (FIG. 2) in which the blade 250 is outside the duct 204 and a deployed position (FIG. 3) in which the blade 250 is across the duct 204 in order to redirect the bypass flow 208 towards the window 220.

Each blade 250 is mounted so as to be able to move at a first end while a second end moves closer to the motor 20 when the blade 250 is deployed so as to best block the duct 204.

The blades 250 are angularly offset from one to the next about the longitudinal axis X.

The number of blades 250, and the shape of each of these, depend on the dimensions of the turbofan engine 100 and on the width of each blade 250 in order that, in the deployed position, the blades 250 block the majority of the duct 204.

Passage from the stowed position to the deployed position is brought about by rotation of the blade 250 towards the interior of the turbofan engine 100.

The stowed position can be adopted when the slider 218 is in the advanced position. The deployed position can be adopted only when the slider 218 is in the retracted position.

The slider 218 also bears a maneuvering system which moves each blade 250 from the stowed position to the deployed position and vice versa, and which is described hereinbelow.

Thus, operation comprises, starting from the advanced/stowed position, ordering activation of the actuators to move the slider 218 from the advanced position to the retracted position. During this movement, the maneuvering system moves the blades 250 from the stowed position to the deployed position.

Conversely, operation thus comprises, starting from the retracted/deployed position, ordering activation of the actuators to move the slider 218 from the retracted position to the advanced position. During this movement, the maneuvering system moves the blades 250 from the deployed position to the stowed position.

The use of the blades 250 mounted so as to be able to rotate on the slider 218 permits compatibility with a C-structure nacelle (also known as a "C-duct") in relation to the use of thrust reverser doors of the prior art.

The maneuvering system may take any possible shape known to a person skilled in the art, such as a rack-and-pinion motorized system.

Figure 5:
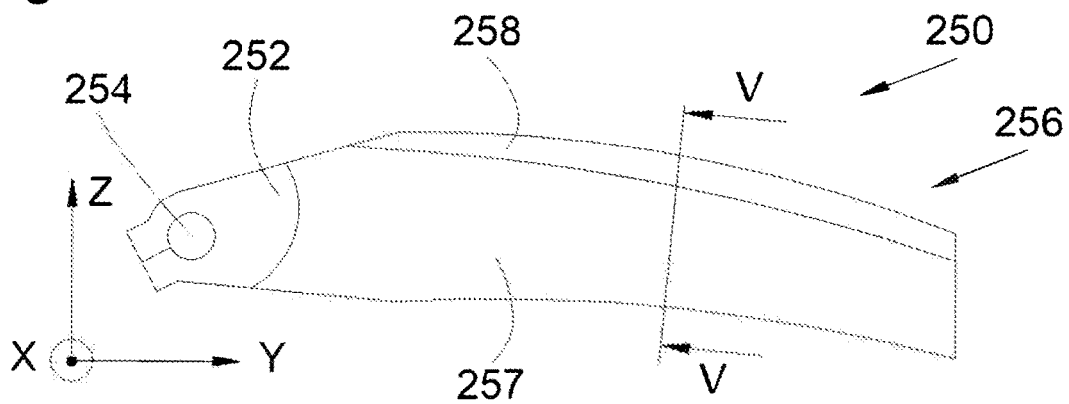
FIG. 5 is a front view of a blade according to the invention.

FIG. 5 shows a blade 250 which comprises a core 252 that has a first end mounted so as to be mobile in rotation on the slider 218, the rotation being brought about by any appropriate means such as, in this example, by a bore 254 created at the first end and intended to fit onto a pin.

The core 252 has a second, free end, and so the core 252 extends between the first end and the second end.

The core 252 is rigid and is made, for example, of a rigid material, for example of composite materials or of metal such as aluminum. The core 252 is therefore a structural element of the blade 250.

The blade 250 also comprises a sheath 256 into which at least a part of the core 252 and the second end slide.

Figure 6:
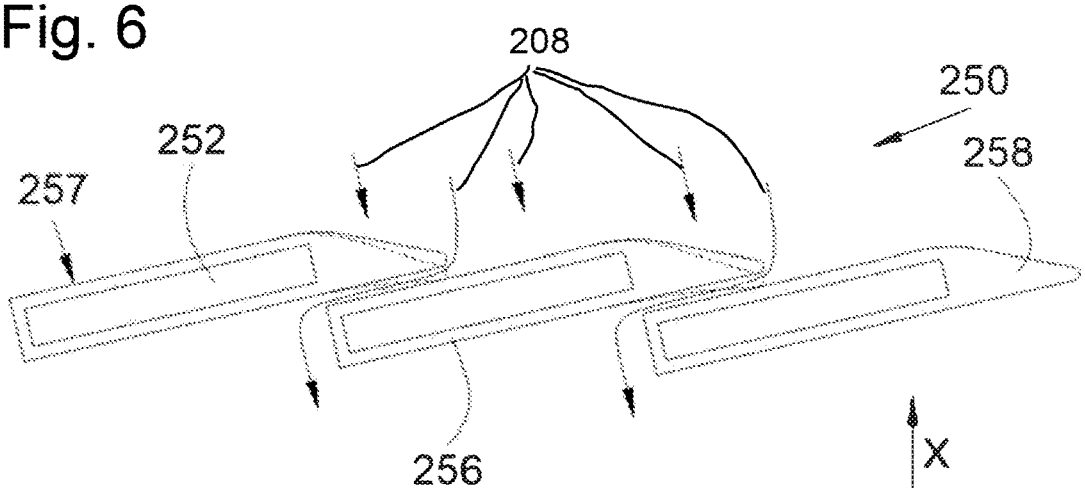
FIG. 6 is a view in section of the blade of FIG. 4 along the line V-V for a set of multiple blades according to the invention.

FIG. 6 shows a section through multiple blades 250 in the deployed position, where two adjacent blades 250 partially overlap.

The sheath 256 is made of a flexible material such as silicon or fabric. The sheath 256 is therefore a non-structural element of the blade 250.

The sheath 256 can be fixed to the core 252 by any appropriate means, such as rivets borne by the core 252 and to be drawn with a metal insert through the sheath 256, milled rivets with a metal insert positioned on either side of the thickness that is to be gripped and embedded into the sheath 256 and avoid the latter tearing off around the fixing points when under load.

The sheath 256 can, when necessary, be replaced by removing the rivets.

That part of the core 252 that is in the sheath has a rectangular cross-section by virtue of which it is possible to create a core 252 at low cost. Of course, that part of the core 252 that is in the sheath 256 can have a different geometry that is suited to the shape of the sheath 256. Similarly, the sheath 256 may have any geometry that is suited to the shape of that part of the core 252 which is intended to be inserted into the sheath 256.

The sheath 256 comprises a first part 257 which surrounds the cross section, which is, for example, rectangular, of the core 252 and an aileron 258 that extends beyond the core 252 facing the first part 257 of the adjacent blade 250.

Figure 7:
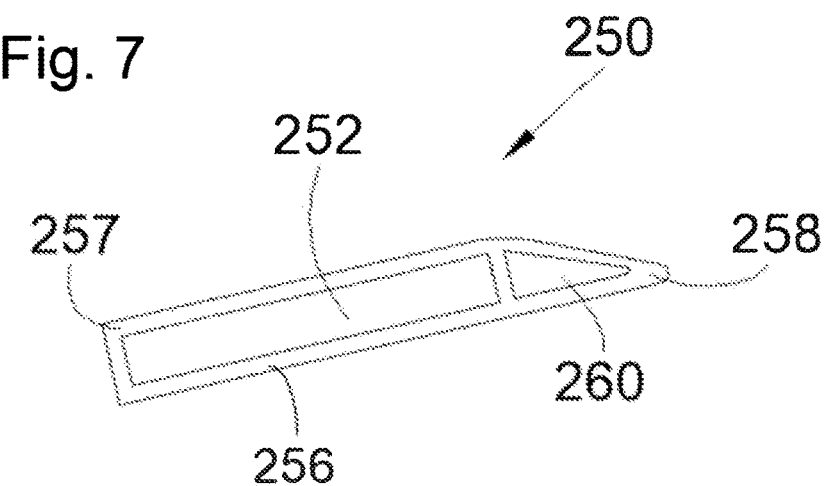
FIG. 7 is a view in section of the blade of FIG. 4 for a variant embodiment of the invention.

According to one embodiment, shown in FIG. 7, the first part 257 and the aileron 258 are monolithic, that is to say, they are formed in one piece.

Figure 8:
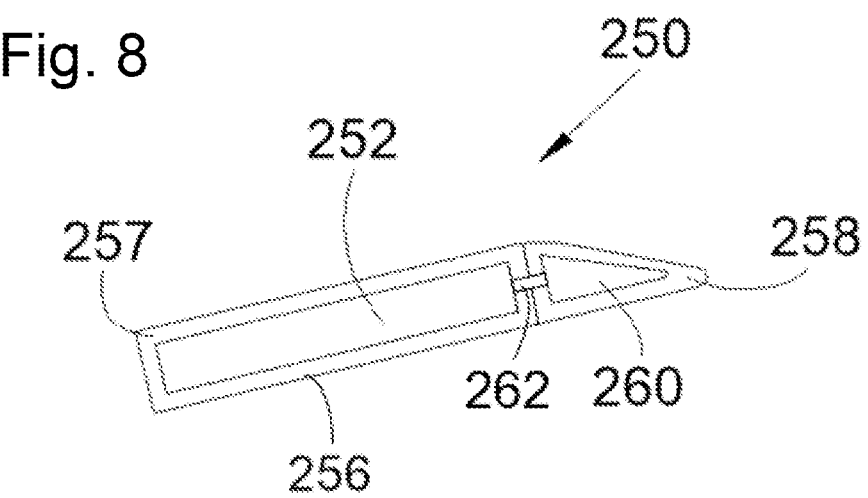
FIG. 8 is a view in section of the blade of FIG. 4 for a variant embodiment of the invention.

According to another embodiment, shown in FIG. 8, the first part 257 is connected to the aileron 258. In other words, the first part 257 and the aileron 258 are formed as two distinct, separate parts and are fixed to one another, for example by adhesive bonding or other methods.

In the thrust reversal position, the bypass flow 208 impinges upon the blades 250, and, in particular, the aileron 258 which comes into contact with the adjacent blade 250. The deformed position of the aileron 258 is depicted in dotted lines in FIG. 6.

The flexibility of the aileron 258 is defined by this ability to come into contact with the adjacent blade 250, and this contact between the aileron 258 and the adjacent blade 250 blocks the gap between the blades 250 and prevents the bypass flow 208 from passing through the blades 250. Thus, the sheath 256 is made of a flexible material in order that, in the deployed position, the bypass flow 208 causes the aileron 258 to come into contact with the first part 257 of the adjacent blade 250. With respect to the direction of flow of the bypass flow 208, each aileron 258 is upstream of the first part 257 of the adjacent blade 250.

Thus, this arrangement makes it possible to reduce acoustic phenomena, in particular low frequencies, that are linked to the passage of the secondary flow 208 between the blades 250.

The sheath 256, and therefore the aileron 258, being fixed on the core 252, and the aileron 258 extending in the extension of the core 252, the deformation of the aileron 258 can be subordinated by the core 252. In other words, the core 252 can manage the deformations of the aileron 258. The core 252 is therefore sufficiently rigid to withstand the loads arising from thrust reversal and can manage the flexibility of the aileron 258 so as to ensure that there is contact between the aileron 258 and the adjacent blade 250.

The aileron 258 extends along one edge of the core 252, which meets the first end at the second end.

At a distance from the first part 257, the aileron 258 has a tapered edge.

FIG. 7 shows a particular embodiment in which the blade 250 comprises an insert 260 accommodated in a hollow created in the aileron 258. This insert 260 makes it possible to increase the rigidity of the aileron 258, and this arrangement is more particularly implemented in the case of the sheath 256 being made of fabric. The insert 260 is made of a rigid material such as metal. The insert 260 extends all along the aileron 258.

FIG. 8 shows a particular embodiment in which the insert 260 is accommodated in a hollow created in the aileron 258, and is connected to the core 252 by a rigid connecting element 262. Thus, the insert 260 forms an extension of the core 252. The connecting element 262 may be in the form of a bar. The connecting element 262 is made of a rigid material such as metal. Although the connecting element 262 is depicted only in FIG. 8, it can also be present in FIG. 7.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan engine comprising:
a motor, and
a nacelle surrounding the motor,
wherein a duct in which a bypass flow flows is delimited between the nacelle and the motor,
said nacelle comprising a plurality of blades, each blade being mounted mobile in rotation between a stowed position in which the blade is not in the duct and a deployed position in which the blade is across the duct,
each blade comprising a rigid core having a first end that is mounted mobile in rotation and a second, free end, and
a sheath comprising a first part which surrounds at least one part of the core and the second free end, and an aileron which extends beyond the core facing the first part of an adjacent blade,
the sheath being made of a flexible material such that, in the deployed position, the bypass flow causes the aileron to come into contact with the first part of the adjacent blade.

2. The turbofan engine according to claim 1, wherein, at a distance from the first part, the aileron has a tapered edge.

3. The turbofan engine according to claim 1, wherein the first part and the aileron are monolithic.

4. The turbofan engine according to claim 1, wherein the first part and the aileron are two distinct parts that are fixed to one another.

5. The turbofan engine according to claim 1, wherein the blade comprises an insert accommodated in a hollow created in the aileron.

6. The turbofan engine according to claim 5, wherein the insert is connected to the core by a rigid connecting element.

7. An aircraft having at least one turbofan according to claim 1.

* * * * *